(12) United States Patent
Wang et al.

(10) Patent No.: US 11,318,907 B2
(45) Date of Patent: May 3, 2022

(54) CURTAIN AIRBAG ASSEMBLY

(71) Applicant: AUTOLIV ASP, INC., Ogden, UT (US)

(72) Inventors: Xiaohong Wang, Farmington, UT (US); Hiroki Sasakura, Yokohama (JP)

(73) Assignee: Autoliv ASP, Inc., Ogden, UT (US)

( * ) Notice: Subject to any disclaimer, the term of this patent is extended or adjusted under 35 U.S.C. 154(b) by 195 days.

(21) Appl. No.: 16/580,549

(22) Filed: Sep. 24, 2019

(65) Prior Publication Data
US 2021/0086718 A1 Mar. 25, 2021

(51) Int. Cl.
| | |
|---|---|
| *B60R 21/2338* | (2011.01) |
| *B60R 21/213* | (2011.01) |
| *B60R 21/231* | (2011.01) |
| *B60R 21/232* | (2011.01) |
| *B60R 21/16* | (2006.01) |

(52) U.S. Cl.
CPC ........ *B60R 21/2338* (2013.01); *B60R 21/213* (2013.01); *B60R 21/232* (2013.01); *B60R 21/23138* (2013.01); *B60R 2021/161* (2013.01); *B60R 2021/23386* (2013.01)

(58) Field of Classification Search
None
See application file for complete search history.

(56) References Cited

U.S. PATENT DOCUMENTS

| | | | | |
|---|---|---|---|---|
| 6,422,593 | B1 * | 7/2002 | Ryan | B60R 21/232 |
| | | | | 280/730.2 |
| 6,464,250 | B1 * | 10/2002 | Faigle | B60R 21/232 |
| | | | | 280/730.2 |
| 2003/0098573 | A1 | 5/2003 | Sonnenberg et al. | |
| 2004/0140653 | A1 * | 7/2004 | Bossecker | B60R 21/2338 |
| | | | | 280/730.2 |
| 2005/0116450 | A1 * | 6/2005 | Noguchi | B60R 21/2338 |
| | | | | 280/730.2 |
| 2008/0079246 | A1 | 4/2008 | Dix | |
| 2010/0013203 | A1 | 1/2010 | Mitchell et al. | |
| 2014/0217707 | A1 * | 8/2014 | Konishi | B60R 21/213 |
| | | | | 280/728.2 |
| 2014/0265268 | A1 | 9/2014 | Wang et al. | |

FOREIGN PATENT DOCUMENTS

WO 2004096614 A1 11/2004

OTHER PUBLICATIONS

International Search Report and Written Opinion received for the PCT Application No. PCT/US2020/039548, dated Aug. 24, 2020, 14 pages.

* cited by examiner

*Primary Examiner* — Drew J Brown
(74) *Attorney, Agent, or Firm* — Harness, Dickey & Pierce, P.L.C.; Stephen T. Olson

(57) ABSTRACT

An airbag assembly for a motor vehicle includes an inflatable airbag, a tether, and at least one guide member. The tether controls deployment of the inflatable airbag. The tether has a fixed length between a first end and a second end. The at least one guide member slidably receives the tether such that the tether has a first adjustable length portion between the first end and the at least one guide member and the tether has a second adjustable length portion between the second end and the at least one guide member.

15 Claims, 4 Drawing Sheets

CURTAIN AIRBAG ASSEMBLY

FIELD

The present disclosure relates to inflatable restraints for motor vehicle safety systems. More particularly, the present disclosure relates to a curtain airbag for a motor vehicle and a method of protecting an occupant of a motor vehicle with a curtain airbag.

BACKGROUND

This section provides background information related to the present disclosure which is not necessarily prior art.

Inflatable safety restraint devices or airbags are commonly included on motor vehicles. In the event of an accident, a sensor within the vehicle measures abnormal deceleration and triggers ignition of a charge contained within an inflator. Expanding gases from the charge travel through conduits and fill the airbags, which instantaneously inflate to protect passengers within the vehicle from harmful impact with the interior of the vehicle. Typically, airbags are concealed within the vehicle trim to be invisible during normal vehicle operation.

Conventional airbag systems include curtain airbag system for the protection of vehicle occupants from lateral impacts and vehicle rollovers. Inflatable curtain airbags are typically stowed along the corner where the vehicle roof meets the side windows and pillars. These inflatable curtain airbags may be stowed behind the headliner trim at the edge of the headliner.

In various airbag systems, tethers are employed to control positioning of an airbag within the occupant compartment of a vehicle. One end of the tether may be attached to the vehicle and the other end of the tether may be attached to the airbag, for example. A tension created by the tether depends on a tether length difference between stowed and deployed positions of the airbag. For example, where the tether is stowed in a headliner along a long continuous curved shape and the tether is straight upon deployment, an amount of tether tension upon deployment may be reduced.

While known curtain airbag assemblies have proven to be suitable for their intended uses, a continuous need for improvement in the relevant art remains. For example, in certain airbag applications it may be desirable to increase the tether tension upon deployment to more ideally position the deployed airbag.

SUMMARY

This section provides a general summary of the disclosure, and is not a comprehensive disclosure of its full scope or all of its features.

In accordance with one particular aspect, the present teachings provide an airbag assembly for a motor vehicle including an inflatable airbag, a tether, and at least one tether guide member. The tether and the guide member cooperate to control positioning of the inflatable airbag upon deployment. The tether has a fixed length between a first end and a second end. The at least one guide member slidably receives the tether such that the tether has a first adjustable length portion between the first end and the at least one guide member, and the tether has a second adjustable length portion between the second end and the at least one guide member.

In accordance with another aspect, the present teachings provide a curtain airbag assembly for a motor vehicle including an inflatable airbag, a tether, and at least one guide member. The inflatable airbag has a length in a length direction, a height in a height direction, and a depth in a depth direction. The first end of the tether is attached to the inflatable airbag. The at least one guide member is attached to the inflatable airbag and slidably receives the tether such that the tether has a first adjustable length portion between the first end and the at least one guide member, and a second adjustable length portion between the second end and the at least one guide member. The first adjustable length portion of the tether is at a non-zero angle relative to the second adjustable length portion of the tether, in a plane defined by the length direction and the height direction. The tether and the at least one guide member cooperate to control positioning of the inflatable airbag upon deployment.

In accordance with still another particular aspect, the present teachings provide a method for deploying a curtain airbag. The method includes inflating the inflatable airbag to increase a depth of the inflatable airbag and decrease a distance between the first and second ends of the tether in both a height direction of the inflatable airbag and a length direction of the inflatable airbag.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
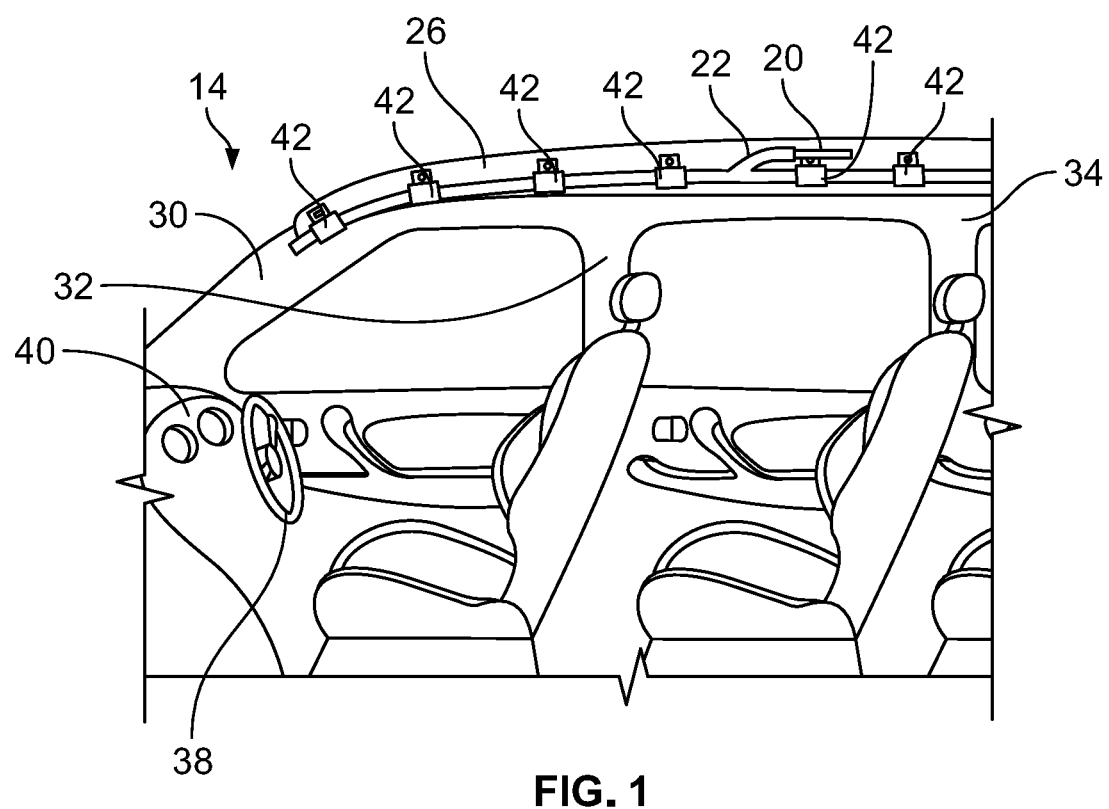
FIG. 1 is a side view of a curtain airbag assembly in accordance with the present teachings, the curtain airbag assembly shown in a stowed configuration within an exemplary motor vehicle.

Example embodiments will now be described more fully with reference to the accompanying drawings.

Example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature. "Exemplary" as used herein means serving as a typical or representative example or instance, and does not necessarily mean special or preferred.

With reference to FIGS. 1 through 4, an airbag assembly in accordance with the present teachings is illustrated and generally identified at reference character 10. The airbag assembly 10 is part of an occupant restraint system 12 of a motor vehicle 14. In the embodiment illustrated throughout the drawings, the airbag assembly is a curtain airbag assembly 10. Certain aspects of the present teachings may, however, be used in connection with other air bags.

The motor vehicle 14 shown in the drawings will be understood to be exemplary in nature. The motor vehicle 14 has a longitudinal direction 16 oriented along the length of the motor vehicle 14, a lateral direction 18 oriented from one side of the motor vehicle 14 to the opposing side and a vertical direction 20 oriented vertically up and down. The terms "inboard" and "outboard" may be used herein to refer to a relative orientation in the lateral direction 18. For example, "outboard" refers to a relative location closer to or facing a lateral plane of the vehicle than a longitudinal center plane of the motor vehicle. Conversely, "inboard" refers to a relative location closer to or facing the longitudinal center plane of the vehicle than a lateral side of the motor vehicle. "Inboard" and "outboard" do not require alignment of the two objects in the lateral direction 18; rather, these terms simply relate to proximity to the lateral or medial planes as set forth above.

The airbag assembly 10 may conventionally include an inflator 21, a tube 22, and an inflatable curtain airbag 24. The inflatable curtain airbag 24 receives gas from the inflator 21 through the tube 22. The airbag assembly 10 also includes a sensor and a control system (not shown) that detects a collision/rollover or impending collision/rollover and transmits an activation signal to the inflator 21. The inflator 21 may be one of several types, such as pyrotechnic, stored gas, or a combination inflator and may be a single or multistage inflator. The inflator 21 may be stored at any suitable location relative to the inflatable curtain airbag 24. If the inflator 21 is a pyrotechnic inflator, the inflator 21 may contain a propellant that ignites to rapidly produce inflation gas in response to receipt of the activation signal.

Figure 2:
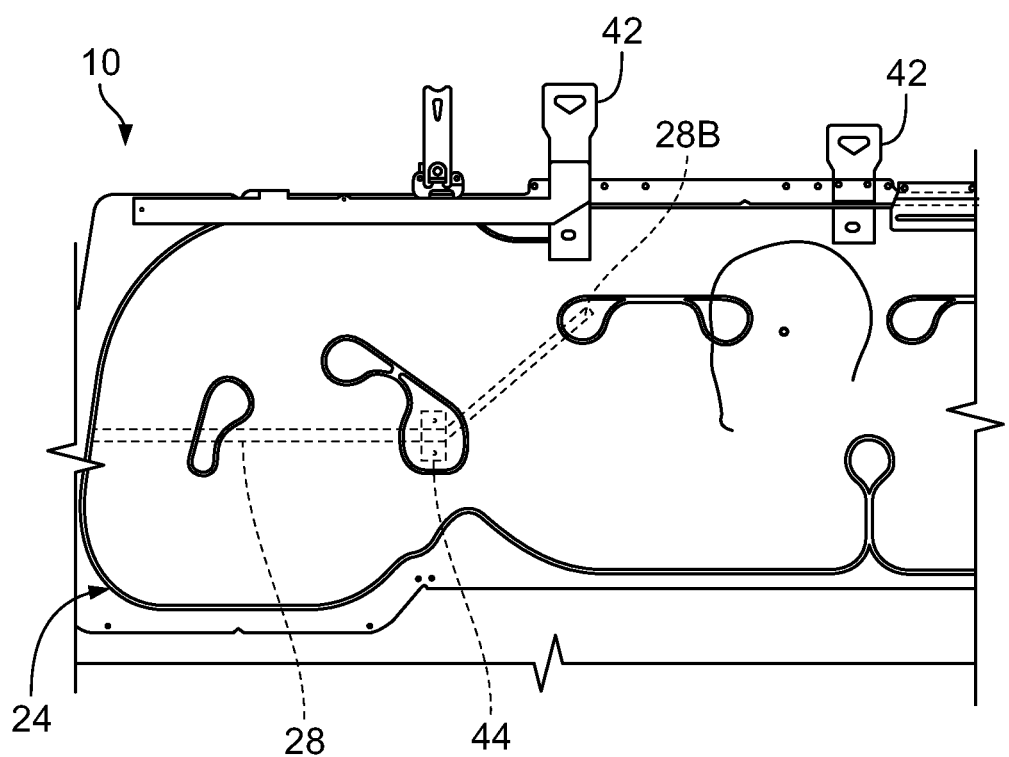
FIG. 2 is a side view of a portion of the airbag of FIG. 1, shown unrolled and prior to inflation.
Figure 3:
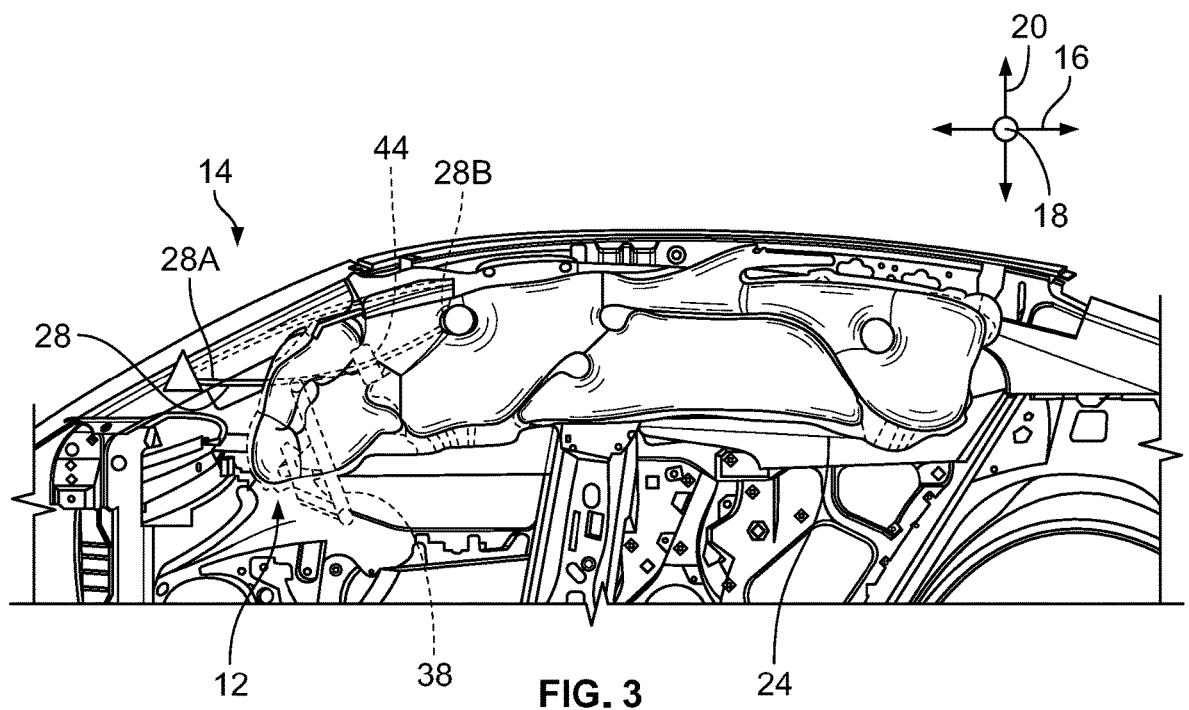
FIG. 3 is a side view of the curtain airbag assembly of 1, the inflatable curtain airbag shown in a deployed configuration.

The inflatable curtain airbag 24 may extend along the longitudinal direction 16 within the vehicle 14 in both the stowed condition (as shown in FIG. 1) and the deployed condition (as shown in FIGS. 2 and 3). The inflatable curtain airbag has a length in the longitudinal direction 16, a height in the vertical direction 20, and a depth in the lateral direction 18. The inflatable curtain airbag 24 may be coupled to or next to a roof rail 26 of the motor vehicle 14.

The airbag assembly 10 may also include one or more tethers for controlling and maintaining a desired deployed orientation of the inflatable curtain airbag 24. The present teachings are shown in the drawings in connection with a forward tether 28. A rear tether or other tethers (not shown) may also be incorporated within the scope of the present teachings. As will be discussed further below, the tether 28 provides a tension that helps keep the inflatable curtain airbag 24 in a desirable position to protect an occupant of the vehicle 14 upon inflation of the inflatable curtain airbag 24.

In the event of an actual or impending collision, the inflatable curtain airbag 24 may expand downward in the vertical direction 20 along the side of the vehicle 14 between one or more passengers of the vehicle 14 and one or more lateral surfaces of the vehicle 14 such as the side windows and pillars (the structures between the lateral windows and/or the windshield and rear window) of the vehicle. The pillars may include an A-pillar 30, a B-pillar 32, and a C-pillar 34, for example, all of which may join the roof rail 26 at their respective upper ends. In the embodiment illustrated, the inflatable curtain airbag 24 extends from the A-pillar 30 to the C-pillar 34 of the motor vehicle 14. Inflation of the inflatable curtain airbag 24 increases the depth of the inflatable curtain airbag 24 in the lateral direction 18 and decreases the height and length of the inflatable curtain airbag 24 in the vertical and longitudinal directions 20 and 16, respectively.

In addition to the airbag assembly 10, other airbags may be installed in the vehicle. For example, a separate driver's side airbag 36 (see FIG. 4) may be used to protect an occupant (i.e., the driver) from impact with various forward surfaces of the vehicle 14, including the steering wheel 38 and instrument panel 40. With the driver's side airbag 36 and the inflatable airbag curtain 24, the airbag assembly 10 may provide supplemental protection by cushioning impact not only against the lateral surfaces mentioned previously, but also cushioning impact against the A-pillar 30 and/or an outboard portion (i.e., outboard of the steering wheel 38) of the instrument panel 40.

The inflatable curtain airbag 24 may normally reside in a stowed configuration, in which the inflatable curtain airbag 24 is concealed behind the interior trim of the vehicle 14, such as the lateral headliner trim. Prior to installation in the motor vehicle 14, the inflatable curtain airbag 24 may be compacted into the stowed configuration, such as by rolling, folding, or a combination thereof, such that the inflatable curtain airbag 24 assumes an elongated shape extending along a pathway with a length that is much greater than the height or width of its cross-sectional shape.

Once compacted into the stowed configuration, the inflatable curtain airbag 24 may be retained in the stowed configuration through the conventional use of wrappers, fasteners, or the like to facilitate shipping and installation. The inflatable curtain airbag 24 may be secured to the motor vehicle 14 with a plurality of mounting assemblies 42 distributed along the length of the inflatable curtain airbag 24. Each of the mounting assemblies 42 may conventionally include a tab secured to the inflatable curtain airbag 24, a fastener that secures the tab to the roof rail 26, and a wrapper that encircles the inflatable curtain airbag 24 to keep the inflatable curtain airbag 24 in the stowed configuration until deployment.

Upon activation, the inflator 21 may generate and/or release inflation gas into the tube 22. From the tube 22, the inflation gas may rapidly enter the inflatable curtain airbag 24, thereby causing the inflatable curtain airbag 24 to begin expanding. The inflatable curtain airbag 24 may exit the stowed configuration and assume an extended shape. When this deployment is complete, the inflatable curtain airbag 24 may be said to be in a deployed configuration, as shown in FIGS. 3 and 4.

The inflatable curtain airbag 24 may be generally formed from two layers of flexible material such as a fabric, and may include an inboard fabric layer at an inboard side of the inflatable curtain airbag 24 and an outboard fabric layer at an outboard side of the inflatable curtain airbag 24. According to one example, the inflatable curtain airbag 24 is generally constructed from a woven nylon fabric, but other fabrics or flexible materials may be used. The inboard and outboard fabric layers may be secured together at a peripheral edge, for example, via peripheral stitching. In the alternative, the inboard and outboard fabric layers may be secured together via mechanical fastening, adhesives, one-piece weaving, RF welding, ultrasonic welding, or any other suitable method known in the art.

The inboard and outboard fabric layers of the inflatable curtain airbag 24 are joined to define a plurality of inflatable chambers. A "chamber" may be defined as an interior cavity within a body. The configuration of the inflatable curtain airbag 24 illustrated in the drawings, including the chambers and other features will be understood to be largely exemplary insofar as the present teachings are concerned.

Figure 4:
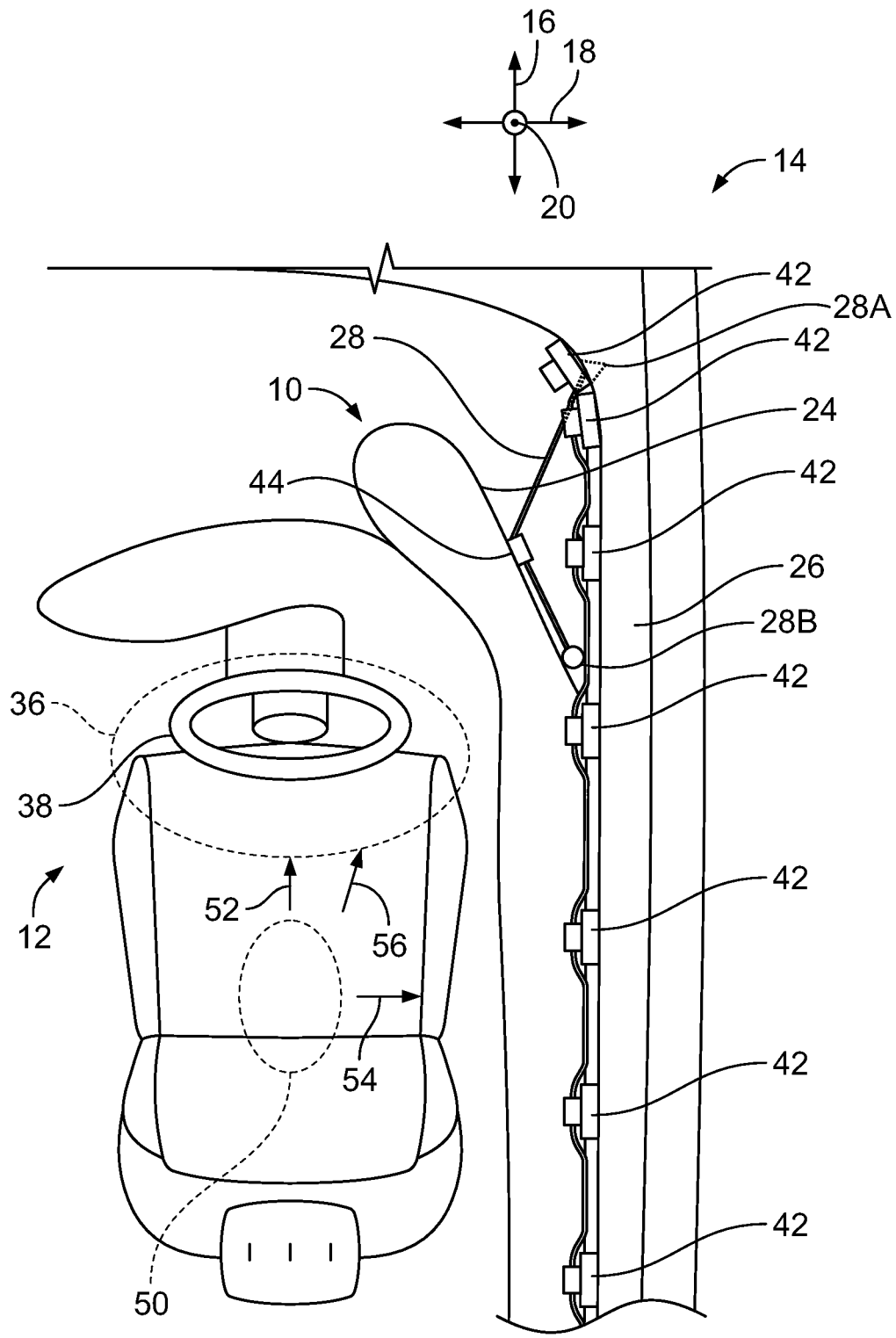
FIG. 4 is a top view of the curtain airbag assembly of FIG. 1, the inflatable curtain airbag again shown in the deployed configuration.

Referring particularly to the top view of FIG. 4, a top view illustrates the airbag assembly 10 with the inflatable curtain airbag 24 in the deployed configuration. Additionally, FIG. 3 illustrates an occupant zone that would ordinarily be occupied by a vehicle occupant's head, or more specifically, the driver's head. FIG. 4 identifies a forward trajectory 52, an outboard trajectory 54, and a forward outboard trajectory 56 of the occupant's head relative to the vehicle 14 in the event of rapid deceleration of the motor vehicle 14 from collision or rollover. The forward trajectory 52 is where the head may move from the occupant zone during an ordinary (i.e., not small overlap or oblique) frontal collision. The outboard trajectory 54 is where the head may move from the occupant zone during a side impact, such as an impact against the side of the vehicle along which the inflatable curtain airbag 24 inflates or a rollover of the vehicle occurs. The forward outboard trajectory 56 is where the head may move from the occupant zone during a small overlap or oblique collision.

As shown, the forward outboard trajectory 56 results from a rotation of the vehicle caused by the small overlap or oblique collision and may tend to move the occupant's head outboard of the steering wheel 38 toward the A-pillar 30 and/or the outboard portion of the instrument panel 40. The presence of the forward position of the inflatable curtain airbag 24 may serve to protect the head from impact with the A-pillar 30 and/or instrument panel 40. Thus, the forward portion of the inflatable curtain airbag 24 may enable the airbag assembly 10 to provide enhanced protection in the event of a rollover or small overlap or oblique collision.

The forward tether 28 may be used to maintain an optimal position of the deployed inflatable curtain airbag 24 to protect the occupant in the event of a collision. Such optimal positioning may protect the driver's head in response to movement along the forward outboard trajectory 56 as shown in FIG. 4, for example. The tether 28 has a first end 28A and a second end 28B. The first end 28A may be connected to the inflatable curtain airbag 24 and the second end 28B may be secured to a part of the motor vehicle 14 such as the roof rail 26. For example, the second end 28B may be secured to one of the mounting assemblies 42 and may thus be secured to the roof rail 26 with the fastener used to secure the tab of the mounting assembly 42 to the roof rail 26. The first end 28A may be secured directly to the inflatable cushion airbag 24. For example, the second end 28B may be secured to an outer side of an outboard facing panel of the inflatable cushion airbag 24 at a non-inflatable portion thereof.

The airbag assembly 10 further includes at least one guide member 44 for slidably receiving the tether 28. In the embodiment illustrated, the at least one guide member includes a single guide member 44 in the form of a loop. It will be understood that the airbag assembly 10 may include additional guide members 44 within the scope of the present teachings. It will also be understood that the guide member 44 may be replaced with any other suitable structure for slidably receiving the tether 28. The guide member 44 may be preferably formed of a low friction material. The guide member 44 may be secured to an outer side of an outboard facing panel of the inflatable cushion airbag 24 at a non-inflatable portion thereof.

The tether 28 includes a first adjustable length portion 58 between the first end 28A and the guide member 44 and a second adjustable length portion 60 between the second end 28B and the guide member 44. When the inflatable curtain airbag 24 is deployed, the tether 28 may slide through the guide member 44 and thereby adjust the lengths of the first and second adjustable length portions 58 and 60. As shown in FIG. 2, for example, the first adjustable length portion 58 may be at a non-zero angle relative to the second adjustable length portion 60 in a plane defined by the length direction of the inflatable curtain airbag 24 and the height direction of the inflatable curtain airbag 24. The non-zero angle is preferably at least 15° and more preferably at least 30°.

Upon inflation of the inflatable curtain airbag 24, the depth of the inflatable curtain airbag 24 increases for purposes of protecting the vehicle occupant 50. As a result of this depth increase, the length and height dimensions of the inflatable curtain airbag 24 are reduced and a distance between the first and second ends of the tether, in both the height direction and the length direction, are reduced. The tether 28 functions to position the formed end of the inflatable curtain airbag 24 within the motor vehicle 14 to protect the occupant 50, particularly in the event of forward outboard trajectory 56 of the head.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure. The airbag assembly 10 is shown in use on the driver's side of the vehicle 14. In the embodiment illustrated, the vehicle is a right hand drive motor vehicle 14. A similarly configured (i.e., mirror image or near-mirror image) airbag assembly may be used on the passenger's side of the motor vehicle 14 in addition or in the alternative to the airbag assembly 10. For example, it will again be appreciated that the configuration of the airbag assembly 10 is merely exemplary. A variety of types and configurations of inflatable curtain airbags may be utilized within the scope of the present disclosure. For example, in alternative embodiments, varying sizes, shapes, and proportions of inflatable curtain airbags may be used. An automaker may select from such alternative embodiments based on the desired location within the vehicle, the anticipated collision type and severity, the likely habits of vehicle occupants, and any other criteria recognized by those of skill in the automotive safety arts.

What is claimed is:

1. An inflatable curtain airbag assembly for a motor vehicle, the inflatable curtain airbag assembly comprising:
   an inflatable airbag having a length in a length direction, a height in a height direction and a depth in a depth direction;
   a tether having a fixed length between a first end and a second end; and at least one guide member slidably receiving the tether such that the tether is elongated along a first axis and has a first adjustable length portion between the first end and the at least one guide member, and the tether is elongated along a second axis and has a second adjustable length portion between the second end and the at least one guide member, the guide member mounted to the inflatable airbag at a first mounting location, the first mounting location spaced from a perimeter of the inflatable airbag in both the length direction and the height direction, wherein the first axis is at a non-zero angle relative to the second axis in a plane defined by the length direction and the height direction, the non-zero angle being at least 15°, wherein the tether and the at least one guide member cooperate to control positioning of the inflatable airbag upon deployment, and wherein the first end of the tether is mounted to the inflatable airbag at a second mounting location, the second mounting location being a non-inflatable portion of the inflatable airbag spaced from the perimeter of the inflatable airbag in both the length direction and the height direction.

2. The inflatable curtain airbag assembly of claim 1, wherein the at least one guide member includes a loop.

3. The inflatable curtain airbag assembly of claim 1, wherein the at least one guide member is attached to an outer side of an outboard facing panel of the inflatable airbag.

4. The inflatable curtain airbag assembly of claim 1, wherein the first end of the tether and the at least one guide member are both attached to an outer side of an outboard facing panel of the inflatable airbag.

5. The inflatable curtain airbag assembly of claim 4, wherein the first end of the tether and the at least one guide member are both attached to non-inflatable portions of the inflatable airbag.

6. A method of protecting an occupant of a motor vehicle with the inflatable curtain airbag assembly of claim 1.

7. The method of protecting an occupant of a motor vehicle of claim 6, the method comprising:

inflating the inflatable airbag to increase the depth of the inflatable airbag and decrease a distance between the first and second ends of the tether in both the height direction of the inflatable airbag and the length direction of the inflatable airbag.

8. The inflatable curtain airbag assembly of claim 1, wherein the first end of the guide member is fixed to the airbag at a second mounting location, the first mounting location of the second end of the tether being upwardly and rearwardly located relative to the second mounting location of the first end of the guide member.

9. A curtain airbag assembly for a motor vehicle, the curtain airbag assembly comprising:

an inflatable airbag having a length in a length direction, a height in a height direction, and a depth in a depth direction;

a tether having a fixed length between a first end and a second end, the first end of the tether attached to the inflatable airbag; and at least one guide member attached to the inflatable airbag, the at least one guide member slidably receiving the tether such that the tether has a first adjustable length portion elongated along a first axis between the first end and the at least one guide member and a second adjustable length portion elongated along a second axis between the second end and the at least one guide member, the guide member mounted to the inflatable airbag at a first mounting location, the first mounting location spaced from a perimeter of the inflatable airbag in both the length direction and the height direction wherein the first adjustable length portion of the tether is at a non-zero angle relative to the second adjustable length portion of the tether in a plane defined by the length direction and the height direction, the non-zero angle being at least 15°; and wherein the tether and the at least one guide member cooperate to control positioning of the inflatable airbag upon deployment, and wherein a first end of the tether is mounted to the inflatable airbag at a second mounting location, the second mounting location being a non-inflatable portion of the inflatable airbag spaced from the perimeter of the inflatable airbag in both the length direction and the height direction.

10. The curtain airbag assembly of claim 9, wherein the first end of the tether and the at least one guide member are both attached to an outer side of an outboard facing panel of the inflatable airbag.

11. The curtain airbag assembly of claim 10, wherein the first end of the tether and the at least one guide member are both attached to non-inflatable portions of the inflatable airbag.

12. The curtain airbag assembly of claim 9, wherein inflation of the inflatable airbag increases the depth of the inflatable airbag and reduces a distance between the first and second ends of the tether in both the height direction and the length direction.

13. The curtain airbag assembly of claim 9, wherein the non-zero angle is at least 30°.

14. The curtain airbag assembly of claim 9 in combination with the motor vehicle.

15. The inflatable curtain airbag assembly of claim 9, wherein the first end of the guide member is fixed to the airbag at a second mounting location, the first mounting location of the second end of the tether being upwardly and rearwardly located relative to the second mounting location of the first end of the guide member.

* * * * *